United States Patent
Suresh et al.

(10) Patent No.: US 9,703,579 B2
(45) Date of Patent: Jul. 11, 2017

(54) DEBUG ENVIRONMENT FOR A MULTI USER HARDWARE ASSISTED VERIFICATION SYSTEM

(71) Applicant: Mentor Graphics Corporation, Wilsonville, OR (US)

(72) Inventors: Krishnamurthy Suresh, Noida, IN (US); Charles W. Selvidge, Wellesley, MA (US); Sanjay Gupta, Noida, IN (US); Amit Jain, New Delhi, IN (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/875,267

(22) Filed: May 1, 2013

(65) Prior Publication Data

US 2014/0032204 A1    Jan. 30, 2014

Related U.S. Application Data

(63) Continuation-in-part of application No. 13/873,196, filed on Apr. 29, 2013.

(60) Provisional application No. 61/741,788, filed on May 1, 2012, provisional application No. 61/741,787, filed on Apr. 27, 2012.

(51) Int. Cl.
    *G06F 9/455*   (2006.01)
    *G06F 11/36*   (2006.01)
    *G06F 11/26*   (2006.01)

(52) U.S. Cl.
    CPC .......... *G06F 9/455* (2013.01); *G06F 11/261* (2013.01); *G06F 11/3652* (2013.01)

(58) Field of Classification Search
    USPC .......................................... 703/23
    See application file for complete search history.

(56) References Cited

U.S. PATENT DOCUMENTS

| | | |
|---|---|---|
| 4,872,125 A | 10/1989 | Catlin |
| 5,649,176 A | 7/1997 | Selvidge et al. |
| 5,659,716 A | 8/1997 | Selvidge et al. |

(Continued)

OTHER PUBLICATIONS

Hassoun et al., "A Transaction-Based Unified Architecture for Simulation and Emulation," IEEE Transactions on Very Large Scale Integration (VLSI) Systems, vol. 13, No. 2, Feb. 2005, pp. 278-287.

(Continued)

*Primary Examiner* — Saif Alhija
(74) *Attorney, Agent, or Firm* — Klarquist Sparkman, LLP

(57) ABSTRACT

Technologies for debugging hardware errors discovered during hardware assisted software verification processes are provided. For example, in one embodiment, a concurrent emulation debug environment including a concurrent emulation system, an emulation trace module and a model state module is provided. The concurrent emulation system includes an emulator and an emulation control station configured to allow simultaneous emulation of multiple electronic designs. The model state module is configured to record the state of the electronic designs during emulation and the emulation trace module is configured to capture trace data associated with the emulation. A backup and capture module is also disclosed that is configured to store the recorded state and the captured trace data for use during a hardware debug process.

15 Claims, 5 Drawing Sheets

(56) References Cited

U.S. PATENT DOCUMENTS

| | | | |
|---|---|---|---|
| 5,802,348 A | 9/1998 | Stewart et al. | |
| 5,937,179 A | 8/1999 | Swoboda | |
| 5,960,191 A | 9/1999 | Sample et al. | |
| 6,173,434 B1 | 1/2001 | Wirthlin et al. | |
| 6,223,148 B1 | 4/2001 | Stewart et al. | |
| 6,263,484 B1 | 7/2001 | Yang | |
| 6,269,457 B1* | 7/2001 | Lane | G06F 11/2273 714/38.1 |
| 6,304,998 B1 | 10/2001 | Kamiya et al. | |
| 6,785,873 B1* | 8/2004 | Tseng | G06F 17/5022 716/102 |
| 6,817,001 B1 | 11/2004 | Kudlugi et al. | |
| 6,876,962 B2 | 4/2005 | Reblewski | |
| 6,961,691 B1 | 11/2005 | Selvidge et al. | |
| 6,999,910 B2 | 2/2006 | Koford et al. | |
| 7,039,576 B2 | 5/2006 | Akita | |
| 7,069,526 B2 | 6/2006 | Schubert et al. | |
| 7,143,377 B1 | 11/2006 | Kudlugi et al. | |
| 7,240,303 B1 | 7/2007 | Schubert et al. | |
| 7,257,802 B2 | 8/2007 | Daw et al. | |
| 7,260,798 B2 | 8/2007 | Gupta et al. | |
| 7,454,722 B2 | 11/2008 | Gupta et al. | |
| 7,480,609 B1 | 1/2009 | Cavanagh et al. | |
| 7,480,610 B2 | 1/2009 | Scott et al. | |
| 7,730,353 B2 | 6/2010 | Brunot et al. | |
| RE41,659 E | 9/2010 | Gupta et al. | |
| 8,108,198 B2 | 1/2012 | Schmitt et al. | |
| 8,108,729 B2 | 1/2012 | Brunot et al. | |
| 8,181,129 B2 | 5/2012 | Gupta et al. | |
| 8,229,727 B2 | 7/2012 | Gupta et al. | |
| 8,352,242 B2 | 1/2013 | Schmitt et al. | |
| 8,516,411 B2 | 8/2013 | Gupta et al. | |
| 8,843,861 B2 | 9/2014 | Selvidge | |
| 2001/0010036 A1 | 7/2001 | Stewart et al. | |
| 2003/0055622 A1 | 3/2003 | Reblewski | |
| 2005/0080502 A1 | 4/2005 | Chernyak et al. | |
| 2005/0198606 A1 | 9/2005 | Gupta et al. | |
| 2005/0268268 A1 | 12/2005 | Wang et al. | |
| 2006/0036427 A1 | 2/2006 | Chaumont et al. | |
| 2007/0180413 A1 | 8/2007 | Park | |
| 2008/0222581 A1 | 9/2008 | Banerjee et al. | |
| 2009/0216514 A1 | 8/2009 | Durand et al. | |
| 2009/0248390 A1 | 10/2009 | Durand et al. | |
| 2010/0306728 A1 | 12/2010 | Ardeishar et al. | |
| 2012/0221316 A1 | 8/2012 | Brunot et al. | |
| 2013/0318484 A1 | 11/2013 | Selvidge | |
| 2014/0052430 A1 | 2/2014 | Suresh et al. | |
| 2015/0149973 A1 | 5/2015 | Selvidge et al. | |

OTHER PUBLICATIONS

Matsumoto et al., "Parallel Logic Simulation on a Distributed Memory Machine," 3rd European Conference on Design Automation, Mar. 16-19, 1992, pp. 76-80.

Walder et al., "Fast Online Task Placement on FPGAs: Free Space Partitioning and 2D-Hashing," Proceedings of the International Parallel and Distributed Processing Symposium, Apr. 22-26, 2003, 8 pages.

Wen et al., "Concurrent-Simulation-Based Remote IP Evaluation over the Internet for System-on-a-Chip Design," Proceedings of the 14th International Symposium on Systems Synthesis, Oct. 1-3, 2001, pp. 233-238.

Boehm, "Unisys Uses Quickturn's CoBALT At Core of 24-7 Verification Methodology," *Electronic News*, vol. 44, p. 62 (Nov. 1998).

Burns et al., "A Dynamic Reconfiguration Run-Time System," *IEEE Sym. on Field-Programmable Custom Computing Machines*, 10 pp. (Apr. 1997).

Jean et al., "Dynamic Reconfiguration to Support Concurrent Applications," *IEEE Trans. On Computers*, vol. 48, No. 6, pp. 591-602 (Jun. 1999).

* cited by examiner

DEBUG ENVIRONMENT FOR A MULTI USER HARDWARE ASSISTED VERIFICATION SYSTEM

RELATED APPLICATIONS

The present application claims priority under 35 U.S.C. §119 to U.S. Provisional Patent Application No. 61/741,788 (initially assigned U.S. patent application Ser. No. 13/461, 543) entitled "Debug Environment For A Multi User Hardware Assisted Verification System," naming Charles Selvidge and Krishnamurthy Suresh as inventors, which application is incorporated entirely herein by reference. This application also is a continuation-in-part of U.S. patent application Ser. No. 13/873,196, entitled "Partitionless Multi-User Support For Hardware Assisted Verification," filed on Apr. 29, 2013, and naming Charles Selvidge and Krishnamurthy Suresh as inventors, which application in turn claims priority under 35 U.S.C. §119 to U.S. Provisional Patent Application No. 61/741,787 (formerly U.S. patent application Ser. No. 13/458,041) entitled "Partitionless Multi-User Support For Hardware Assisted Verification," filed on Apr. 27, 2012, and naming Charles Selvidge and Krishnamurthy Suresh as inventors, both of which applications are incorporated entirely herein by reference

FIELD

The present application is directed towards the field of hardware emulation systems. Particularly, to facilitating debugging of electronic designs concurrently emulated on a single emulator.

BACKGROUND

Electronic circuits, such as integrated circuits, are used in a variety of products, from automobiles to microwaves to personal computers. Designing and fabricating these circuits involves many steps, known as a "design flow." The particular steps of a design flow often are dependent upon the type of circuit being designed, its complexity, the design team, and the circuit fabricator or foundry that will manufacture the circuit. Typically, software and hardware "tools" will test a design at various stages of the design flow. The results of this testing then are used to identify and correct errors in the design. These testing processes are often referred to as verification, validation, or testing.

In some instances, verification will be facilitated by emulating the circuit design using a hardware emulator. Examples of hardware emulators include the VELOCE family of emulators available from Mentor Graphics Corporation of Wilsonville, Oreg. An emulator typically will provide a set of configurable components for mimicking the operation of a circuit design. For example, emulators that use field-programmable gate array circuits can emulate the functionality of a circuit design using a combination of state elements, memories and lookup tables. Of course, other types of emulators may provide additional or alternate primitive components. For example, an emulator may function by using combinatorial elements computing a selectable function over a fixed number of inputs.

Most emulators include the ability to have their total capacity partitioned into smaller sections. The ability to partition an emulator has many advantageous, such as reducing the amount of unused capacity during emulation. Most partitioning techniques have many restrictions however. For example, typically, a limit is imposed on the smallest capacity that the emulator can be partitioned into. Accordingly, for sub-portions of a circuit that are smaller than this limit, emulator capacity will still be unusable. Furthermore, some emulators limit the partitioning to an integral multiple of the minimum capacity limit.

Another way that emulators limit the partitioning is by requiring that each partition occupy one or more emulator "boards." As indicated above, hardware emulators provide a set of configurable components that may be arranged to behave like the circuit design. Typically, these configurable components are placed onto a "board," which includes the necessary wiring and connection structure to interconnect the configurable components. A single emulator board will have the ability to emulate a specified number of gates. In order to increase the capacity of the emulator, multiple boards can be connected together. Accordingly, many emulators restrict the emulator from being partitioned at less than the "board" level. More particularly, each partition must include one or more boards.

As can be appreciated, these restrictions often mean a significant amount of the total emulator's capacity is still unusable. For example, suppose an emulator with 12 boards and the ability to be partitioned at the board level were provided. Further suppose that a sub-portion of an SOC design that corresponded to the capacity of 1.2 boards (i.e. 10% of the total emulator capacity) were desired to be emulated in multiple partitions. Under this example, only 6 instances of the sub-portion could be instantiated in the emulator and 40% of the total emulator capacity would remain unusable.

In addition to verifying the functionality of circuit designs, hardware emulators are often used to test software designed to operate on the circuit. As those of ordinary skill in the art will appreciate, many modern circuit designs include both "hardware" content and "software" content. These types of circuits are often referred to as a system on a chip ("SoC" or "SOC") and include multiple components packaged into the same circuit. Many SOC designs include a memory component that stores computer executable instructions designed to control some of the functionality or operation of the SOC. Hardware emulators then are used to allow the development and testing of these computer executable instructions prior to manufacturing of the circuit.

Similar to hardware verification, software verification is often performed using an emulator as a resource. More specifically, an emulator is configured to implement an electronic design. The emulator then is operated with computer executable instructions corresponding to the software as input to the electronic design. Subsequently, the operation of the software can be verified. However, as modern design cycles increasingly shorten, development and testing of the "software" content of a circuit design begins prior to finalizing the design of the "hardware" content. As a result, bugs in the hardware component are often found during software verification.

SUMMARY

Aspects of the disclosed technology are directed towards facilitating the debugging of an electronic design being concurrently emulated with other electronic designs in a single emulator.

In one exemplary implementation, an emulation debug environment having a concurrent emulation system, an emulation trace module and a model state module is provided. The concurrent emulation system includes an emulator and an emulation control station. The emulation control station includes a model compaction module that is configured to combine multiple design models into a combined model. In some implementations, the design models are merged to form the combined model, where each design model is represented as a virtual design within the combined model. The emulator is configurable to implement this combined model.

Embodiments of the disclosed emulation debug environment further include an emulation trace module and a model state module. The emulation trace module is configured to capture logical values in selected locations of a model or models within the combined model. For example, logical values on selected signal lines corresponding to a model implemented in the emulator may be captured. As will be detailed below, this model, which the logical values can be captured from, can be a portion of the combined model implemented in the emulator.

The model state module is configured to capture the logical values corresponding to a "state" (explained below) of one of the models within the combined model at a particular point during execution of the emulator. The model state module is further configured to set the state of the model to the captured state at another point during execution of the emulator.

The emulation debug environment may also include a backup and capture module configured to store the captured state described above and then store logical values captured by the emulation trace value from the point during execution of the emulator corresponding to the captured state until another, later point during execution of the emulator.

In some implementations, test benches that utilize the emulation debug environment as a resource during hardware assisted software verification can also be used.

These and additional implementations of the disclosed technology will be further understood from the following detailed disclosure of illustrative embodiments.

BRIEF DESCRIPTION OF THE DRAWINGS

The disclosed technology will be described by way of illustrative implementations shown in the accompanying drawings in which like references denote similar elements, and in which.

DETAILED DESCRIPTION OF THE INVENTION

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods. Additionally, as used herein, the term "and/or" means any one item or combination of items in the phrase.

It should also be noted that the detailed description sometimes uses terms like "generate" to describe the disclosed implementations. Such terms are often high-level abstractions of the actual operations that are performed. The actual operations that correspond to these terms may vary depending on the particular implementation.

Illustrative Operating Environment

Figure 1:
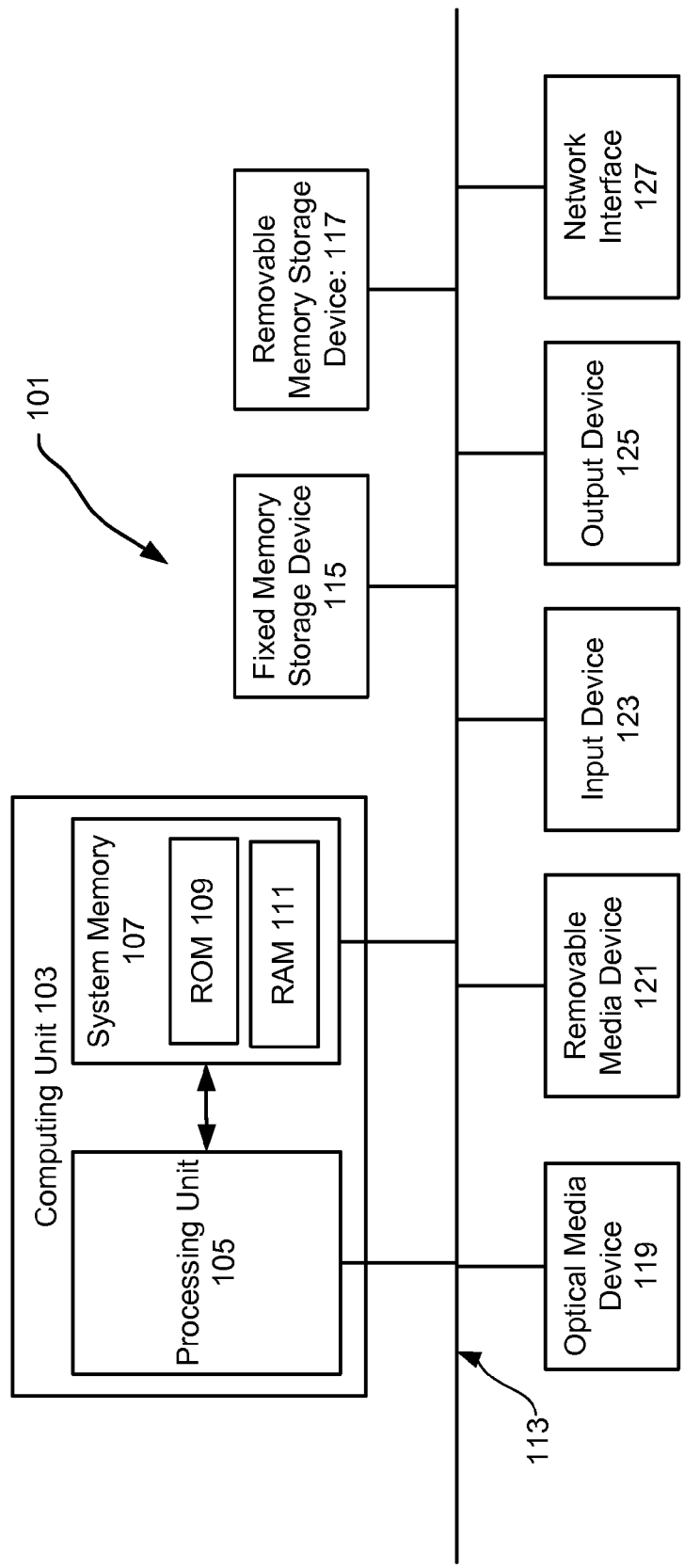
FIG. 1 illustrates a programmable computing device.

Because certain embodiments of the disclosed technology can be implemented by a computer system executing software instructions, the components and operation of an exemplary computer system on which various implementations of the disclosed technology can be employed are described. FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be one or more microprocessors. The system memory 107 may include both a read-only memory ("ROM") 109 and a random access memory ("RAM") 111. As will be appreciated by those of ordinary skill in the art, both the ROM 109 and the RAM 111 can store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as: a fixed memory storage device 115, for example, a magnetic disk drive or solid state memory device; a removable memory storage device 117, for example, a removable solid state disk drive; an optical media device 119, for example, a digital video disk drive; or a removable media device 121. The processing unit 105 and the system memory 107 also can be directly or indirectly connected to one or more input devices 123 and one or more output devices 125. The input devices 123 can include, for example, a keyboard, a pointing device (such as a mouse, touchpad, touchscreen stylus, trackball, or joystick), a scanner, a camera, and/or a microphone. The output devices 125 can include, for example, a monitor display, touchscreen, a printer, and/or speakers. With various examples of the computing device 101, one or more of the peripheral devices 115-125 can be internally housed with the computing unit 103. Alternately, one or more of the peripheral devices 115-125 can be external to the housing for the computing unit 103 and connected to the bus 113 through, for example, a Universal Serial Bus ("USB") connection.

In some implementations, the computing unit 103 is directly or indirectly connected to one or more network interfaces 127 for communicating with other devices making up a network. The network interface 127 translates data and control signals from the computing unit 103 into network messages according to one or more communication protocols, such as the transmission control protocol ("TCP") and/or the Internet protocol ("IP"). Also, the interface 127 can employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the disclosed technology can be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the disclosed technology can be implemented using a multi-processor computer, a plurality of single and/or multiprocessor computers arranged into a network, or some combination of both.

As stated above, various embodiments of the disclosed technology can be implemented using a programmable computer system executing software instructions stored on a computer readable medium. Particularly, these software instructions can be stored on one or more computer readable media or devices, such as, for example, the system memory 107, fixed memory storage device 115, removable memory storage device 117, removable media device 121, or an optical disk for use in the optical media device 119. As those of ordinary skill in the art will appreciate, software instructions stored in the manner described herein are inherently non-transitory in nature. More specifically, the software instructions are available for execution by the computer system 101, as opposed to being transmitted to the computer system via a carrier wave or some other transitory signal.

Concurrent Emulation

As stated above, various implementations of the invention are directed towards debugging a design being concurrently emulated with other designs on a single emulator. Emulators are typically comprised of configurable logic components, like field-programmable gate arrays. In other implementations, these configurable logic components may be configurable application-specific integrated circuits. In order to "configure" an emulator to "emulate" an electronic design, a model for the electronic design is first generated. Subsequently, "configuration code" is generated based on the model. This configuration code may then be used to cause the configurable logic components in the emulator to implement the model. The model implemented in the emulator is often referred to as the "design under test" or "DUT".

Figure 2A:
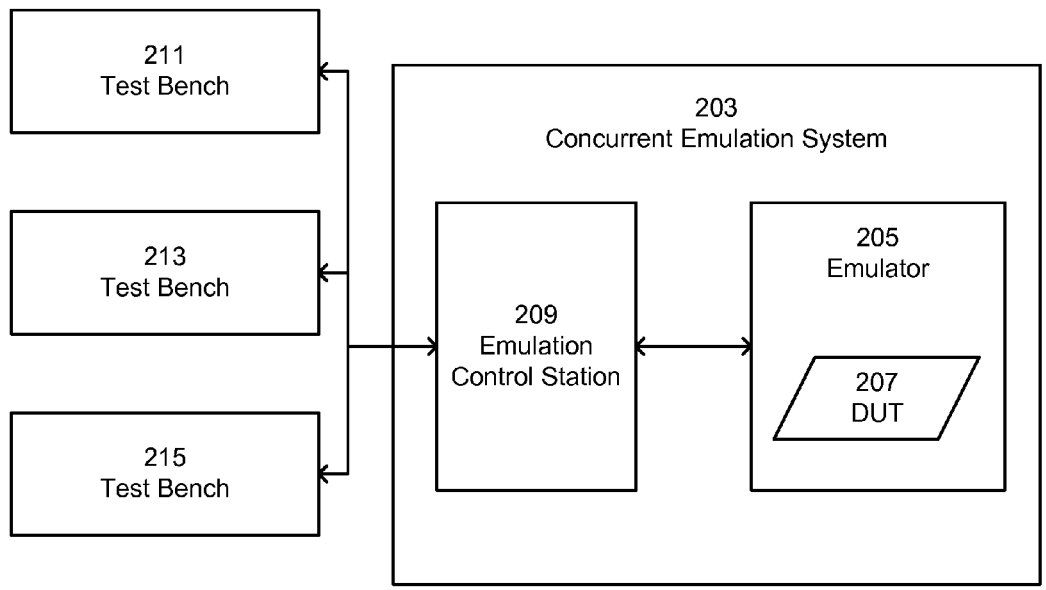
FIG. 2A shows an exemplary concurrent emulation system.

FIG. 2A shows an exemplary concurrent emulation system 203 that may be provided by various implementations of the present invention. As can be seen from this figure, the concurrent emulation system 203 includes an emulator 205, shown emulating a design under test 207 implemented within the emulator 205. An emulation control station 209 is also shown included within the concurrent emulation system 203. Test benches 211-215, although not shown included within the concurrent emulation system, are shown for discussion purposes. An example of a concurrent emulation system that may be used to implement the concurrent emulation system 203 is described in U.S. patent application Ser. No. 13/458,041, filed on Apr. 27, 2012, entitled "Partitionless Multi User Support for Hardware Assisted Verification," naming Sanjay Gupta et al. as inventors, which application is incorporated entirely herein by reference.

Figure 2B:
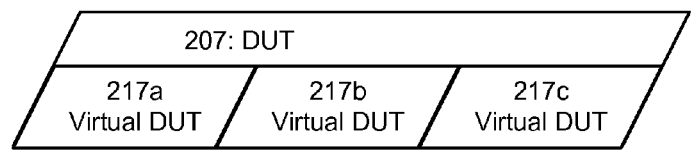
FIG. 2B shows an exemplary design under test that may be implemented in the concurrent emulation system of FIG. 2A.

As indicated, the concurrent emulation system 203 is configured to allow for multiple electronic designs to be simultaneously emulated. The emulation control station combines multiple individual models into a single combined model, which can then be used to configure to the emulator 205 to implement this combined model as the DUT 207. FIG. 2B shows the DUT 207 having multiple virtual DUTs 217a-217c included therein. The virtual DUTs 217 correspond to these individual models. As those of ordinary skill in the art will appreciate, these individual models further correspond to designs for electronic devices. The behavior of these electronic devices are what is being mimicked or otherwise modeled when the DUT 207 is implemented in the emulator 205. In various implementations, the DUT 207 may be implemented in the emulator using one or more configurable components, such as, for example, field programmable gate arrays or custom programmable integrated circuits.

During a typical emulation process, one of the test benches 211-215 provides input values, referred to as "stimulus," to the emulator 205 for application to one of the virtual DUTs 217. For example, the test bench 211 can provide signals to use as stimulus to the virtual DUT 217a during operation of the concurrent emulation system 203. The test bench (e.g., the test bench 211) will often also collect "trace data" from the concurrent emulation system 203 during emulation. This trace data can be logical values on various signal lines within one of the virtual DUTs 217 (e.g., the virtual DUT 217a). Similarly, this trace data can be logical values stored within various data storage locations, such as, for example, registers within the virtual DUT 217a.

Application of stimulus and capturing of trace data is commonly facilitated by transactors. In various implementations, portions of the concurrent emulation system 203 will be implemented using transactors. A transactor is an interface between a test bench (e.g., the test bench 211) and the emulator 205. More specifically, the transactor provides a link between the signal level interface of the electronic designs as represented by the DUT 207 and the transaction-level interfaces of the test benches 211-215. As those of ordinary skill in the art will appreciate, transactions include generating input signals and requesting trace data. Transactors are typically provided for different types of communication buses that may be implemented in a design to be emulated, such as, for example, universal serial bus (USB) or primary component interconnect (PCI). Furthermore, transactors are now commonly provided that are compliant with the Standard Co-Emulation APA: Modeling Interface (SCE-MI). Those of ordinary skill in the art will appreciate how to implement a transactor without further explanation.

Concurrent Emulation Debug Environment

Figure 3:
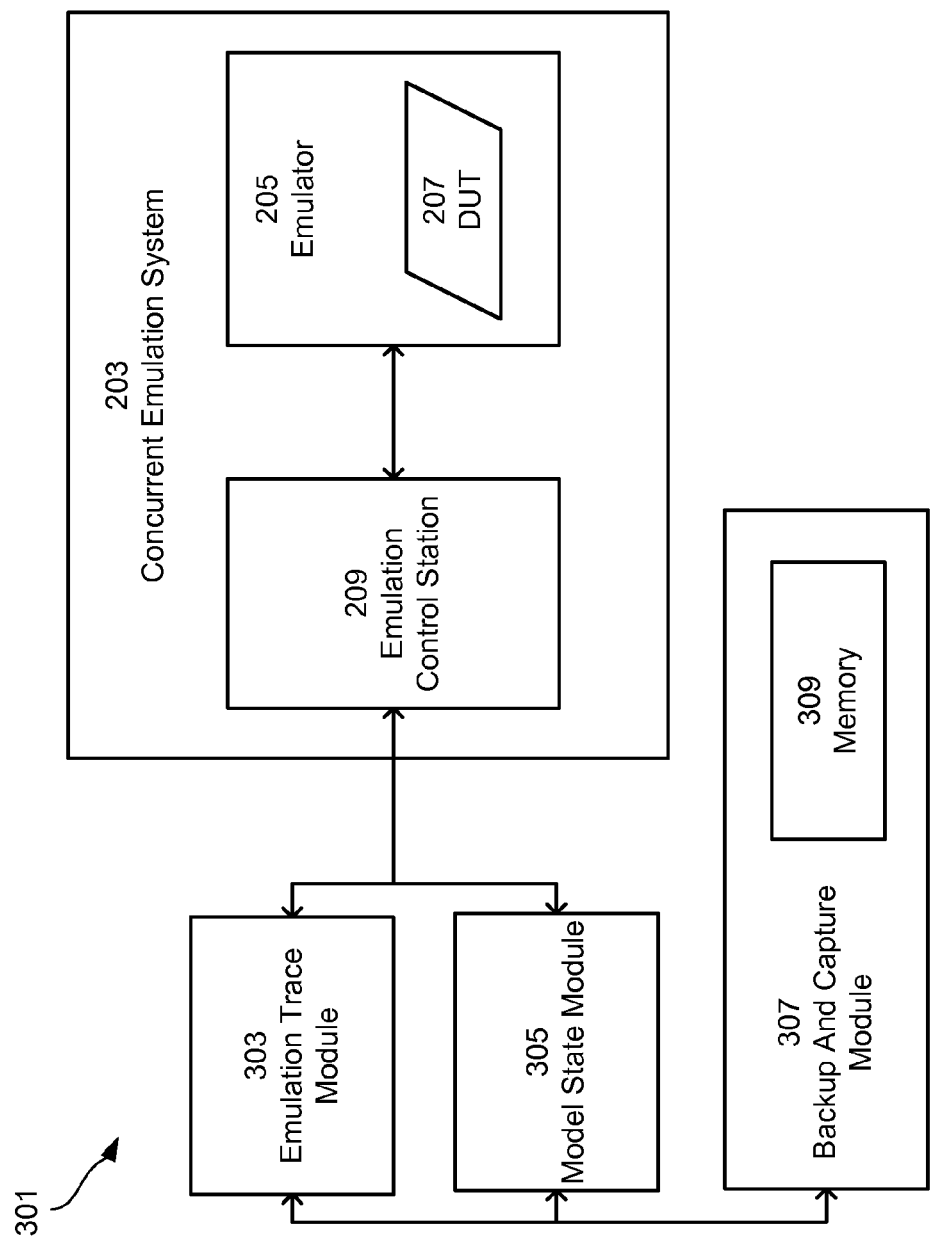
FIG. 3 shows an exemplary concurrent emulation debug environment.

FIG. 3 shows an exemplary concurrent emulation debug environment 301, including the concurrent emulation system 203, an emulation trace module 303, and a model state module 305. As indicated above, the model state module 305 is configured to capture the logical values corresponding to a "state" of one of the virtual DUTs 217 as a first point during a verification process. In some example, the model state module 305 may be implemented as memory circuitry within the emulator 205. For example, the module state module may comprise flip-flops that may store the state of the DUT 207.

This first point of the verification process is referred to herein as the "capture point". The state of the selected DUT 217 at the capture point is referred to herein as the "recorded state." For example, one or more of the logical values stored in the different state elements (e.g., registers, such as flip flops) and/or the values output by the combinational elements (e.g., gates or LUTs) represented in the virtual DUT 217a at the capture point can form the recorded state. More particularly, in some implementations, the recorded state may comprise the state of all state elements within the design. In other implementations, the recorded state may comprise the state of some of the state elements within the design, such as, for example, state elements within a specified region or area of the design or state elements corresponding to a particular portion of the design.

The emulation trace module 303 is configured to capture logical values from selected locations of one of the DUTs 217 during a verification process. For example, the emulation trace module 303 can capture signal values on selected signal lines (e.g., inputs/outputs to different state or combinatorial elements) represented in the selected virtual DUT 217 at a point during emulation. In various implementations, the emulation trace module 303 captures trace data from the capture point until a second, later point, during verification. This second point during verification is referred to herein as the "replay point". The captured signal values are referred to as the "captured trace data".

As indicated, in some implementations, a backup and capture module 307 is provided in the concurrent emulation debug environment 301. The backup and capture module 307 is configured to store the recorded state as captured by the model state module 305 and the captured trace data as captured by the emulation trace module 303. In various implementations, the backup and capture module 307 will include a memory 309 to store these values.

Figure 4:
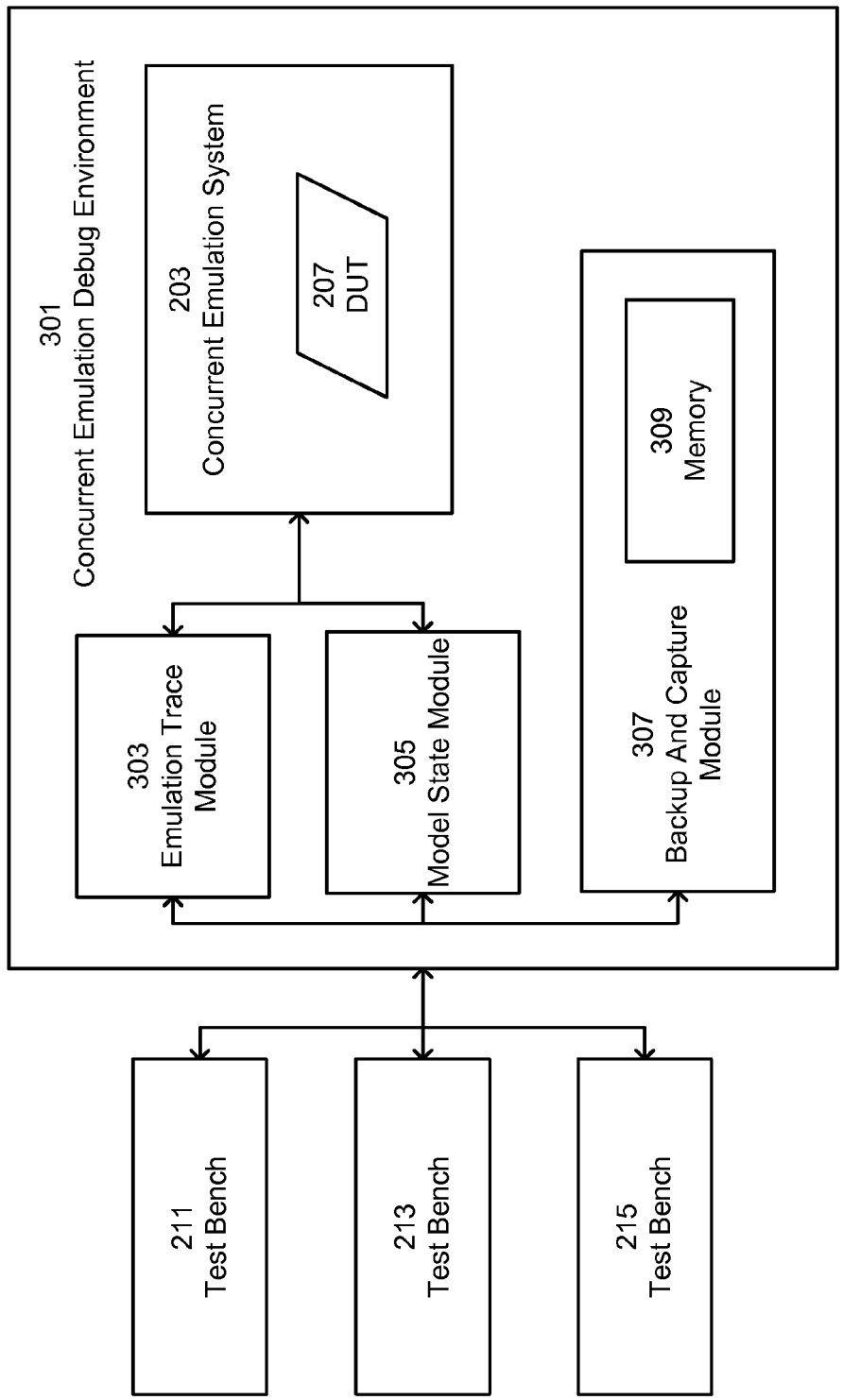
FIG. 4 shows the exemplary concurrent emulation debug environment of FIG. 3 in alternate detail.

FIG. 4 shows the concurrent emulation debug environment 301 of FIG. 3, along with the test benches 211-215 shown in FIG. 2A. As indicated above, the test benches 211-215 can utilize the concurrent emulation debug environment 301 during a hardware assisted verification process. For example, the concurrent emulation system 203 can be configured to implement the DUT 207, which can include, for example, multiple instances of the same SOC processor core or multiple instances of another circuit design. Subsequently, hardware assisted software verification processes can be initiated by the test benches 211-215 using the implemented instances of the SOC processor core or other design as a computing platform for execution of the software being verified. As those of ordinary skill in the art will appreciate, during software development, changes are often made to the software, which results in multiple versions of the software. These different software versions can then be verified using the concurrent emulation debug environment.

In some implementations, the backup and capture module 307 is configured to store the recorded state and the captured trace data for each verification process that is using the concurrent emulation debug environment as a resource. In further implementations, the backup and capture module 307 is configured to iteratively store the recorded states and captured trace data. For example, the model state module 305 can be configured to record the state of the virtual DUTs 217 during emulation every n clock cycles, where n is an integer. In some implementations, n may be between 10,000 and 1,000,000 clock cycles. Accordingly, every n clock cycles during emulation, a new capture point will be generated. The emulation trace module 303 then is configured to capture trace data between theses capture points. As a result, the recorded state and the captured trace data as stored in the memory 309 will be replaced every n clock cycles.

Hardware Debug Using the Concurrent Emulation Debug Environment

Figure 5:
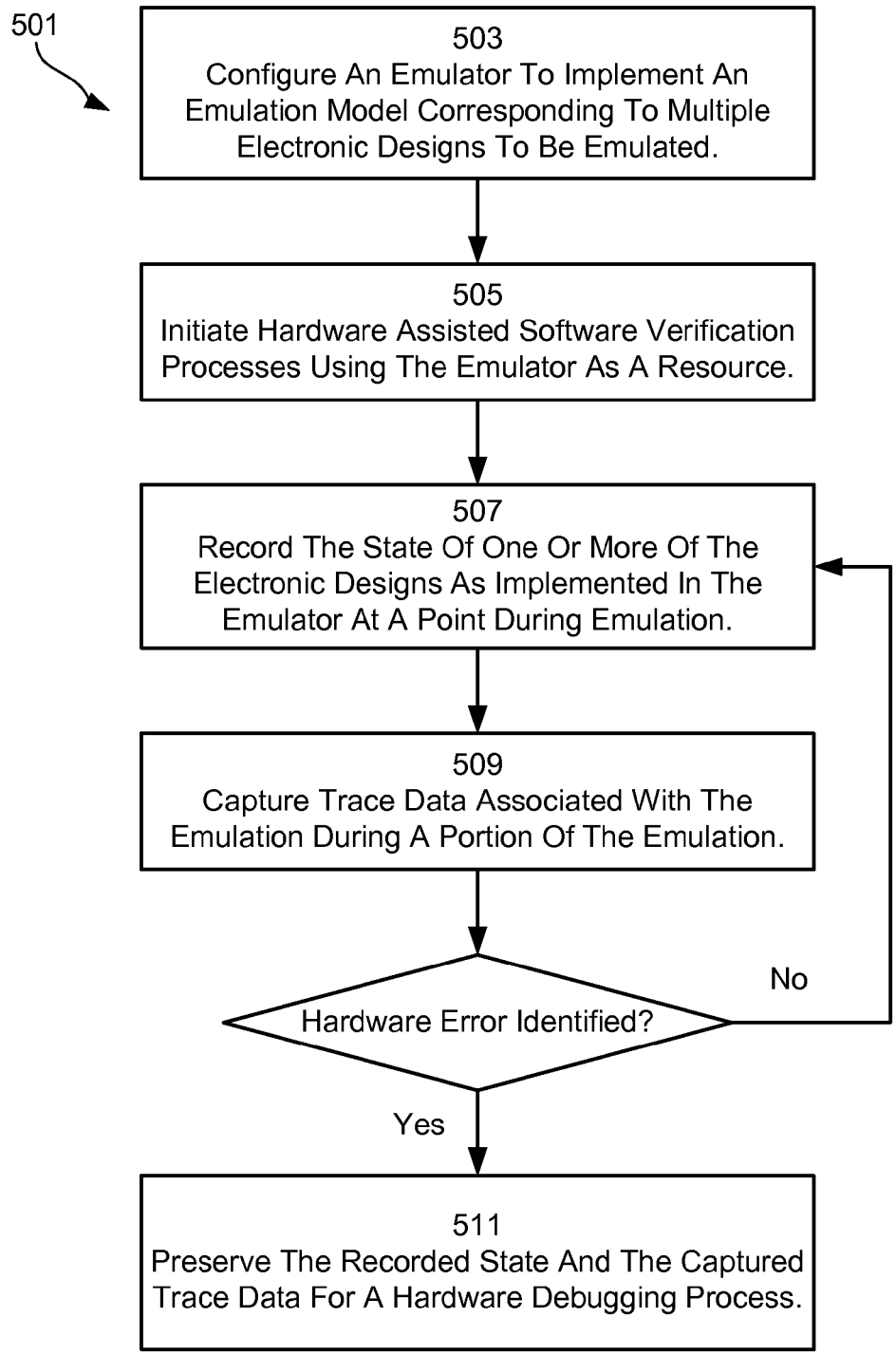
FIG. 5 illustrates an exemplary method of debugging a concurrently emulated electronic design.

FIG. 5 illustrates a method 501 for debugging suspected hardware errors in an electronic design being concurrently emulated with other electronic designs as part of a hardware assisted software verification process. The method 501 may be performed using the embodiments previously described, such as, for example, the concurrent emulation debug environment 301. While the method 501 is described with respect to the embodiment shown in FIG. 4, different embodiments of the invention may also be used to perform the method 501, or some combination of those embodiments referenced here and other embodiments of the invention may be used.

As can be seen from FIG. 5, the emulator 203 is configured to implement the DUT 207 corresponding to multiple electronic designs (e.g., the virtual DUTs 217) at operation 503. Subsequently, hardware assisted software verification process(es) are initiated by the test benches 211-215 at operation 505. As indicated above, the concurrent emulation debug environment 301 is configured such that simultaneous emulation of the virtual DUTs 217 is possible. Accordingly, multiple concurrent hardware assisted software verification processes can be initiated by the operation 505.

Operations 507 and 509 are provided to backup the state of the virtual DUTs 217 during the verification and to capture trace data associated with the verification. As indicated above, the recorded state may be captured every n clock cycles. For example, the operation 507 may be configured to capture the state of the virtual DUTs 217 being used during verification every 100,000 clock cycles of emulation. As those of ordinary skill in the art will appreciate, the emulation for each individual virtual DUT 217 may not proceed at the same pace. More specifically, the emulation of one virtual DUT 217 may be paused or otherwise stalled while the emulation of another virtual DUT 217 proceeds. As a result, although the capture points will be specified as every n clock cycles, they may not align during operation. Furthermore, as indicated above, a capture point can be created every n clock cycles. As such, the operation 509 will capture the trace data between these captures points.

The method 501 then includes an operation 511 for preserving the recorded state and the captured trace data for a hardware debugging process. As can be seen from this figure, the operation 511 operates if a hardware error is identified during the hardware assisted software verification process. When a hardware error is not identified, the method 501 returns to the operation 507, where a new recorded state will be generated after which new captured trace data will be generated by the operation 509. As those of ordinary skill in the art will appreciate, the recorded state and the captured trace data will continue to "roll" forward as the hardware assisted software verification process, and consequentially the emulation, proceeds without detection of a hardware error. Once an error is detected, the recorded state and captured trace data will cover the period during which the error was identified. As a result, the recorded state and the captured trace data can then be used to recreate the conditions under which the error occurred.

As indicated above, software development, especially in the fields of SOC design, begins before the hardware component designs of the SOC are finalized. As a result, hardware errors will typically be identified during verification of the software components. However, as those of ordinary skill in the art will appreciate, hardware debug usually involves different tools than software debug. As a result, the software debug environment implemented in the test benches 211-215 will typically not be appropriate for debugging these discovered hardware errors. The method 501 provides a way to continually capture relevant state and trace data that may be passed from the software development team to the hardware development team for debugging of these discovered hardware errors.

With some implementations, the operation 507 and the operation 509 are configured to capture specific values within selected virtual DUTs 217 such that a hardware software co-debug process may be carried out using the recorded state and the captured trace data. For example, those of ordinary skill in the art will appreciate that joint hardware software debug environments, such as, for example, QUESTA® Codelink available from Mentor Graphics Corporation of Wilsonville, can be used to debug hardware and software errors in the same environment.

CONCLUSION

Although certain devices and methods have been described above in terms of the illustrative embodiments, the person of ordinary skill in the art will recognize that other embodiments, examples, substitutions, modification and alterations are possible. It is intended that the following claims and their equivalents cover such other embodiments, examples, substitutions, modifications and alterations within the spirit and scope of the claims and their equivalents.

What is claimed is:

1. An emulation environment for debugging an electronic design concurrently emulated with other electronic designs, the emulation environment comprising:
    an emulation system including an emulator including configurable hardware and connection structure to interconnect the configurable hardware, the emulator configurable to implement multiple electronic designs, emulated simultaneously using the configurable hardware, as a combined model of the multiple electronic designs, an emulation clock manager configured to maintain independent clocks for the multiple electronic designs, and a virtual model link configured to facilitate message traffic with the emulator;
    an emulation trace module configured to capture trace data from a selected one or more of the multiple electronic designs during operation of the emulator; and
    a model state module comprising memory circuitry within the emulator configured to capture state data corresponding to a selected one or more of the multiple electronic designs during operation of the emulator.

2. The emulation environment recited in claim 1, further comprising test benches configured to perform a hardware assisted software verification process using ones of the multiple electronic designs as a resource.

3. The emulation environment recited in claim 1, further comprising a test bench configured to perform a hardware assisted software verification process using a selected one of the multiple electronic designs as a resource, wherein the hardware assisted software verification process includes backing up the state of the selected one of the multiple electronic designs at a point during emulation and recording trace data associated with the emulation of the selected one of the multiple electronic designs.

4. A computer-implemented method for debugging an electronic design concurrently emulated with other electronic designs, the method comprising:
    implementing an emulation model as a combination of multiple electronic designs in an emulator, the emulator including configurable hardware and connection structure to interconnect the configurable hardware, an emulation clock manager configured to maintain independent clocks for each of the multiple electronic designs so that the multiple electronic designs are emulated simultaneously using the emulation model, and a virtual link model configured to pass message traffic between the emulator and multiple test benches employed to perform hardware assisted verification processes using the emulator as a resource; and
    initiating a hardware assisted software verification process on a selected one of the multiple electronic design using the emulator as a resource.

5. The computer-implemented method recited in claim 4, further comprising:
    backing up the state of the selected one of the multiple electronic designs during the hardware assisted software verification process; and
    recording trace data associated with the hardware assisted software verification process, the backed up state and the recorded trace data being usable to debug the selected one of the multiple electronic designs.

6. The computer-implemented method recited in claim 4, further comprising:
    backing up the state of the selected one of the multiple electronic designs during the hardware assisted software verification process; and
    recording trace data associated with the hardware assisted software verification process, the backed up state and the recorded trace data being usable to debug the selected one of the multiple electronic designs in a software hardware co-debug environment.

7. The computer-implemented method recited in claim 4, further comprising initiating multiple hardware assisted software verification processes on selected ones of the multiple electronic designs.

8. The computer-implemented method recited in claim 4, further comprising initiating multiple hardware assisted software verification processes on selected ones of the multiple electronic designs using a regression testing methodology.

9. A non-transitory computer readable storage medium storing the backed up state and the recorded trace data generated by the method of claim 4.

10. A non-transitory computer readable storage medium storing computer executable instructions which when executed by a computer system cause the computer system to perform the method of claim 4.

11. A non-transitory computer readable storage medium storing computer executable instructions which when executed by a computer system perform a method, the method comprising:
    causing an emulation model that is a combination of multiple electronic designs to be loaded into an emulator, the emulator including configurable hardware into which the emulation model is loaded for emulation, the emulator including an emulation clock manager configured to maintain independent clocks for the multiple electronic designs in the emulation model so that the multiple electronic designs are simultaneously emulated and a virtual model link for facilitating message traffic with the emulator; and
    initiating a hardware assisted software verification process on a selected one of the multiple electronic designs using the emulator as a resource.

12. The non-transitory computer readable storage medium recited in claim 11, wherein the method further comprises:
    backing up the state of the selected one of the multiple electronic designs during the hardware assisted software verification process; and
    recording trace data associated with the hardware assisted software verification process, the backed up state and the recorded trace data being usable to debug the selected one of the multiple electronic designs.

13. The non-transitory computer readable storage medium recited in claim 11, wherein the method further comprises:

backing up the state of the selected one of the multiple electronic designs during the hardware assisted software verification process; and recording trace data associated with the hardware assisted software verification process, the backed up state and the recorded trace data being usable to debug the selected one of the multiple electronic designs in a software hardware co-debug environment.

14. The non-transitory computer readable storage medium recited in claim 11, wherein the method further comprises initiating multiple hardware assisted software verification processes on selected ones of the multiple electronic designs.

15. The non-transitory computer readable storage medium recited in claim 11, wherein the method further comprises initiating multiple hardware assisted software verification processes on selected ones of the multiple electronic designs using a regression testing methodology.

* * * * *